United States Patent [19]

Mudge

[11] 3,865,933

[45] Feb. 11, 1975

[54] ANALGESIC COMPOSITION

[75] Inventor: Clifton F. Mudge, Lakewood, Colo.

[73] Assignee: C and A Laboratories, Inc., Denver, Colo.

[22] Filed: May 24, 1972

[21] Appl. No.: 256,307

[52] U.S. Cl.............. 424/153, 424/157, 424/195, 424/232, 424/265, 424/300, 424/317
[51] Int. Cl............................................ A61k 27/00
[58] Field of Search....................424/195, 300, 424/153, 157, 232, 265, 300, 317

[56] References Cited
UNITED STATES PATENTS

| 202,932 | 4/1878 | Collier | 424/134 |
| 206,676 | 8/1878 | Klapp | 424/166 |
| 208,064 | 9/1878 | Blosser | 424/40 |
| 223,058 | 12/1879 | Morrison | 424/14 |
| 320,150 | 6/1855 | Mayo | 424/127 |

OTHER PUBLICATIONS

Merck Index, 7th ed., (1970), p. 646.
American Drug Index, (1970), p.19.

Primary Examiner—Stanley J. Friedman

[57] ABSTRACT

An analgesic composition comprises on the order of 320 parts by weight of mephenesin, 100 parts by weight of magnesium gluconate and minor amounts of a powdered extract of stramonium together with a pharamceutically acceptable carrier.

4 Claims, No Drawings

ANALGESIC COMPOSITION

This invention relates to novel analgesic compositions which are very effective in the conservative management of a wide range of painful conditions, and, in comparison with hitherto known analgesics, are relatively free of side effects.

The physician recognizes pain as a warning signal that an abnormality exists in a tissue and, ideally, rational treatment would consist of correcting the abnormal condition with resulting alleviation of pain. Frequently, however, the basic, or underlying cause of the discomfort does not readily respond to therapy, and the primary objective then becomes one of reducing pain. Available to the physician as analgesics are numerous therapeutic agents ranging from the group of drugs including aspirin on the one extreme to morphine and its pharmacologic relatives on the other.

It is the object of this invention to provide a medicinal product which will surpass the limitations of aspirin or psychogenic aspirin products with respect to safety, potency, duration of action, minimal side effects, patient acceptability and cost.

It has now been found that an effective, non-narcotic, analgesic composition having as its active ingredients 3-(o-Tolyloxy)-1,2 propanediol, tropane alkaloids and magnesium will attain the above-stated objectives. The analgesic composition of this invention comprises from 275 to 400 milligrams of 3-(o-Tolyloxy)-1,2 propanediol, from .02 to .05 milligrams of tropane alkaloids and from 6 to 100 milligrams of magnesium. The active ingredients are dispensed with a pharmaceutically accepted carrier.

3-(tolyloxy)-1,2 propanediol is a drug, commonly known as mephenesin, that has previously been used as a skeletal muscle relaxant and should contain not less than 97.0 percent $C_{10}H_{14}O_3$ (atomic weight, 182.22). Mephenesin, in the laboratory at least, acts with considerable specificity, that is, it depresses polysynaptic reflexes in dosages that cause only minimal sedation to produce reversible muscular relaxations without loss of consciousness. It has been used in the treatment of cerebal palsy and parkinsonism. The value of mephenesin in such uses is markedly restricted because of its brief duration of action and the unpredictability of benefit following oral medication.

Tropane alkaloids are parasympatholitic drugs which exert their effects on the effector tissues and on the central nervous system. These alkaloids have the ability to block the parasympathomimetic (muscarine) effects of acetylcholine. They act distal to the parasympathetic nerve endings to prevent the action of acetylcholine on smooth muscle, glands and heart. Acetylcholine is an ester of choline which occurs in various organs and tissues of the body and is thought to play an important role in the transmission of nerve impulses at synapses and myoneural junctions. The tropane alkaloids are competitive antagonists to the choline esters or parasympathomimetic alkaloids at those sites where acetylcholine exerts a parasympathomimetic or muscarine effect. The release of acetycholine by the nerve endings is not altered. The tropane alkaloids act beyond the nerve endings on the acetylcholine receptors of the effector organ, or to the extent that it is a ganglion blocker, the next nerve in sequence. The nerve function, including liberation of the mediator is not altered. The mechanism underlying the effect of the parasympatholitic drugs on the central nervous system are unknown.

The tropane alkaloids which are within the scope of this invention include atropine, hyoscyamine and scopolamine (hyoscine). These alkaloids may be incorporated as such directly into the analgesic composition or indirectly through the addition of the natural source material or plants from which the specific alkaloids are derived or manufactured. The tropane alkaloids are generally derived from plants. Atropine per se rarely occurs as such in plants, and is the product of the racemization of the levo-isomeride, hyoscyamine, which is converted into atropine through reaction with weak alkalies. In this country, Stramonium is the principal source of the hyoscyamine used in the manufacture of atropine. Scopolamine (hyoscine) is usually produced from the plant Datura metel by well-known processes. Belladonna, hyoscyamus and stramonium yield mydriatic alkaloids characteristic of the Solanaceae family. Many other plants of this group are used largely in the manufacture of the various alkaloids. Distribution of alkaloids in the most important of the plants is shown in the following Table 1.

Table 1

| Plant | Distribution of Solanaceae Alkaloids | | | Most Important Alkaloids |
|---|---|---|---|---|
| | Part Yielding Alkaloid | Percent of Total Alkaloid | | |
| Astropa belladonna | Leaves | 0.15 | – 0.6 | Hyoscyamine |
| | Root | 0.1 | – 0.7 | Hyoscyamine |
| | Seeds | About | 0.8 | Hyoscyamine |
| Datura metel | Leaves | 0.25 | – 0.55 | Scopolamine (Hyoscine) |
| Datura Stramonium | Leaves | 0.2 | – 0.45 | Hyoscyamine |
| | Seeds | 0.2 | – 0.5 | Hyoscyamine |
| Duboisia myoporoides | Seeds | 0.2 | – 0.5 | Hyoscine and hyoscyamine |
| Hyoscyamus muticus | Leaves | 1 | – 1.4 | Hyoscyamine |
| Hyoscyamus niger | Leaves | 0.045 | – 0.08 | Hyoscyamine |
| | Tops | 0.07 | – 0.10 | Hyoscine |

Mephenesin and stramonium leaf in combination have previously been used as a relaxant, tranquilizer and antispasmodic in dosages of 320 milligrams and 15 milligrams (total alkaloids 0.0375 mg), respectively, to produce a mild, easily controllable sedation, allay anxiety, relieve emotional stress and smooth muscle spasms. The combination has not heretofore been known to quiet mild or moderate pain.

In the composition of the present invention, magnesium combined with mephenesin and tropane alkaloids provides an effective analgesic. Magnesium acts directly upon the myoneural junction to produce a blockage by decreasing the acetylcholine release and thereby reducing the effect of acetylcholine on depolarization, and diminishing the excitability of the muscle cell. The magnesium may be incorporated into the instant composition in about 100 milligram quantities or adjusted upon percent magnesium basis to a magnesium content of about 10 weight percent of the active ingredients. The formulation may contain magnesium in the form of magnesium gluconate (Mg 5.8 percent), magnesium acetylsalicylate (Mg 6.36 percent), hydrated magnesium bromide (Mg 8.32 percent), magnesium chloride (Mg 25.54 percent), magnesium hydroxide (Mg 41.69 percent), magnesium oxide (Mg 60.32 percent), magnesium sulfate (Mg 20.20 percent) or magnesium lactate (Mg 9.48 percent).

The following example of the presently preferred embodiment of the invention serves to illustrate a typical formulation of the active ingredients and is not intended to limit or restrict the scope of this invention.

Example 1

| Ingredient | Milligrams per Tablet Basis |
| --- | --- |
| Mephenesin | 320.00 |
| Powdered extract of Stramonium (4X concentration representing 15 mg whole Stramonium leaf, total alkaloids 0.0375 mg) | 3.75 |
| Magnesium Gluconate (Mg 5.8%) | 100.00 |
| Primogel (lubricant-disintegrant) | 5.00 |
| Plasdone (granulating agent, 540 gm per liter anhydrous isopropanol) | 17.00 |
| Total Weight per Tablet | 445.75 mg |

All ingredients are thoroughly admixed and the mixture punched into tablets and seal coated for dispensing. Each tablet contains an effective single dosage which may be administered at a rate of one or two tablets every four to six hours, as required.

The above exemplified analgesic composition was evaluated clinically through direct comparison with aspirin, aspirin compounds and other analgesics. The use of the drug in practical application contained the placebo (or psychogenic) effect in proportion to the other drugs and did not remove the patient from a natural environment, either physically or psychologically. It was noted that muscle relaxation and spasmolysis were supplemental effects. The following Table 2 illustrates the effectiveness of the drug of the present invention as derived from clinical reports.

Table 2

| Indication | Clinical Reports | Effective Relief, % |
| --- | --- | --- |
| Headache: | | |
| Unclassified | 119 | 83 |
| Functional | 3 | 100 |
| Sinus | 14 | 93 |
| Tension | 22 | 78 |
| Vascular | 4 | 75 |
| Total | 162 | 84 |
| Backache | 208 | 88 |
| Menstrual Cramps | 53 | 81 |
| Intestinal Cramps | 37 | 100 |
| "Flu" Discomfort | 64 | 98 |
| Leg Cramps | 30 | 97 |
| Myositis | 39 | 98 |
| Injury: | | |
| Sprain or Strain | 40 | 93 |
| Fracture | 8 | 100 |
| Contusion | 33 | 94 |
| Misc. (Laceration, Burn, etc.) | 6 | 100 |
| Total | 87 | 94 |
| Arthritis: | | |
| Osteo | 9 | 66 |
| Rheumatoid | 9 | 100 |

Table 2-Continued

| Indication | Clinical Reports | Effective Relief, % |
| --- | --- | --- |
| Chest Pain: | | |
| Unclassified | 21 | 100 |
| Pleurisy | 10 | 100 |
| Neck Pain | 35 | 92 |
| Pelvic Pain: | | |
| Gynecologic | 8 | 88 |
| Urologic | 2 | 100 |
| Post-Delivery | 6 | 66 |
| Post-Surgical (after narcotics) | 22 | 91 |
| Miscellaneous: Bursitis, Ecchymosis, Perf. tympanic membrane, etc. | 64 | 92 |
| Total by Indication | 866 | 90 |

The composition of the present invention may be administered to patients in the form of such pharmaceutical preparations as powders, granules, tablets, capsules, troches, drops, solutions, injections, emulsions, syrups, elixirs, etc. The preparations can be produced in accordance with known procedures of usual pharmaceutical preparations.

What is claimed is:

1. The method of alleviating pain in a patient comprising the step of administering to said patient an analgesic composition which is relatively free of side effects which comprises as the active ingredients, from 275 to 400 milligrams of mephenesin, from 0.02 to 0.05 milligrams of tropane alkaloids selected from the group consisting of atropine, hyoscyamine, and scopolamine, and from 6 to 100 milligrams of a magnesium compound selected from the group consisting of magnesium gluconate, magnesium acetylsalicylate, hydrated magnesium bromide, magnesium chloride, magnesium hydroxide, magnesium oxide, magnesium sulfate, and magnesium lactate, together with a pharmaceutically acceptable carrier.

2. The method according to claim 1 wherein the tropane alkaloid requirement is attained through the addition of from 5 to 20 milligrams of powdered extract of Stramonium.

3. The method of claim 1 wherein the magnesium compound is magnesium gluconate.

4. A method of alleviating pain in a patient which comprises the step of administering to said patient an analgesic composition which is relatively free of side effects which comprises as the active ingredients on an as-per-tablet basis, 320.0 milligrams of mephenesin. 3.75 milligrams powdered extract of stramonium having a total alkaloid concentration of 0.0375 milligrams, and on the order of 100.0 milligrams of magnesium gluconate, together with a pharmaceutically acceptable carrier.

* * * * *